(12) United States Patent
Butts

(10) Patent No.: US 12,171,210 B2
(45) Date of Patent: Dec. 24, 2024

(54) FISHING LINE BRAIDED KNOTTING DEVICE

(71) Applicant: Terry Butts, Aurora, IN (US)

(72) Inventor: Terry Butts, Aurora, IN (US)

( * ) Notice: Subject to any disclaimer, the term of this patent is extended or adjusted under 35 U.S.C. 154(b) by 110 days.

(21) Appl. No.: 18/086,258

(22) Filed: Dec. 21, 2022

(65) Prior Publication Data

US 2024/0206447 A1  Jun. 27, 2024

(51) Int. Cl.
*A01K 91/047* (2006.01)

(52) U.S. Cl.
CPC .................. *A01K 91/047* (2013.01)

(58) Field of Classification Search
CPC ...... A01K 91/03; A01K 91/04; A01K 91/053; A01K 91/047
See application file for complete search history.

(56) References Cited

U.S. PATENT DOCUMENTS

| | | | | |
|---|---|---|---|---|
| 1,423,868 A * | 7/1922 | Monahan | ............ | E04G 21/1825 24/130 |
| 1,452,906 A * | 4/1923 | Butler | .................... | B65H 69/06 57/22 |
| 2,182,182 A * | 12/1939 | Stracten | .................. | B65B 67/00 289/17 |
| 2,609,155 A * | 9/1952 | Fosnaugh | .............. | A01K 87/04 72/135 |
| 2,773,713 A * | 12/1956 | Smalley | ................. | A01K 91/04 289/17 |
| 3,606,405 A * | 9/1971 | Lally | ..................... | A01K 91/04 289/17 |
| 4,607,869 A * | 8/1986 | Bersche | ................ | A01K 91/04 289/17 |
| 4,613,173 A | 9/1986 | Rosser | | |
| 5,240,295 A * | 8/1993 | Spencer | .............. | A01K 91/047 289/1.5 |
| 5,690,369 A * | 11/1997 | Steck, III | ............... | B65H 69/04 289/17 |
| D450,770 S | 11/2001 | Starkey | | |
| 6,322,112 B1 | 11/2001 | Duncan | | |
| 7,797,877 B1 * | 9/2010 | Bennis | ................... | A01K 91/03 43/44.87 |
| 8,157,297 B2 * | 4/2012 | Spilbor | .............. | G09B 19/0076 289/17 |

(Continued)

FOREIGN PATENT DOCUMENTS

WO  WO2018160641  9/2018

*Primary Examiner* — Bao-Thieu L Nguyen

(57) ABSTRACT

A fishing line braided knotting device for attaching one fishing line to another includes a base to which a pair of posts is attached, with each post extending perpendicularly from the base proximate to one of its opposed ends. The post comprises lower and upper portions, with the latter being circumferentially smaller than the former. A pair of fasteners is attached singly to the posts. A first fishing line can be looped around the upper portions so that two loop sections of the first fishing line extend substantially in parallel between the posts. One of the fasteners attaches to the first fishing line and a first line tag to secure them in position. A second one of the fasteners selectively attaches to a second fishing line leaving a second line tag available to be positioned around the two loop sections to knot the fishing lines together.

1 Claim, 5 Drawing Sheets

(56) References Cited

U.S. PATENT DOCUMENTS

| | | | | |
|---|---|---|---|---|
| 8,656,632 B1* | 2/2014 | Mercier | ............... | A01K 91/053 |
| | | | | 43/43.12 |
| 9,474,259 B2 | 10/2016 | Banda | | |
| 9,635,847 B1* | 5/2017 | Chaney | ................ | A01K 91/047 |
| 10,856,537 B1* | 12/2020 | Velardi | .................. | B65H 57/14 |
| 2015/0264908 A1* | 9/2015 | Banda | .................... | A01K 91/04 |
| | | | | 289/1.5 |
| 2020/0404895 A1 | 12/2020 | Wheelwright | | |

* cited by examiner

42 ⤴

44 ⤴
Providing a first fishing line and a second fishing line

46 ⤴
Providing a fishing line braided knotting device

48 ⤴
Looping the first fishing line around the upper portions of the posts

50 ⤴
Attaching the first fishing line and a first line tag to a first one of the posts using a fastener 54 ⤴
Attaching the second fishing line to a second one of the posts using a fastener 58 ⤴
Selectively positioning a second line tag around the two loop sections to knot the second fishing line to the first fishing line

FIG. 6

FISHING LINE BRAIDED KNOTTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to knotting devices and more particularly pertains to a new knotting device for attaching one fishing line to another. The present invention discloses a knotting device that makes it easier to knot one fishing line to another.

(2) Description of Related Art Including Information Disclosed Under 37 CFR 1.97 and 1.98

The prior art relates to knotting devices, which may comprise devices that wind two lines to create coils used in knotting two lines together. Related prior art included devices for knotting lines to hooks. What is lacking in the prior art is a knotting device comprising a pair of posts extending from a base, wherein the posts are configured for fixedly support a first line in a loop about which a second line can be positioned to create a knot.

BRIEF SUMMARY OF THE INVENTION

An embodiment of the disclosure meets the needs presented above by generally comprising a base to which a pair of posts is attached, with each post extending substantially perpendicularly from an upper face of the base proximate to a respective opposed end of the base. The post comprises a lower portion and an upper portion, with the upper portion being circumferentially smaller than the lower portion, thereby defining a ridge. Each fastener of a pair of fasteners is attached to a front face of the lower portion of a respective post. The upper portions of the posts are configured to have a first fishing line looped around them so that two loop sections of the first fishing line extend substantially in parallel between the posts. A respective one of the fasteners is configured to selectively attach to the first fishing line and a first line tag to removably secure the first fishing line in position around the posts. A second one of the fasteners is configured to selectively attach to a second fishing line so that a second line tag is available to be selectively positioned around the two loop sections to knot the second fishing line to the first fishing line.

A second embodiment of the disclosure includes a method of creating a braided knot for joining two fishing lines using a fishing line braided knotting device, as per the disclosure above.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a flow diagram for a method utilizing an embodiment of the disclosure.

DETAILED DESCRIPTION OF THE INVENTION

Figure 1:
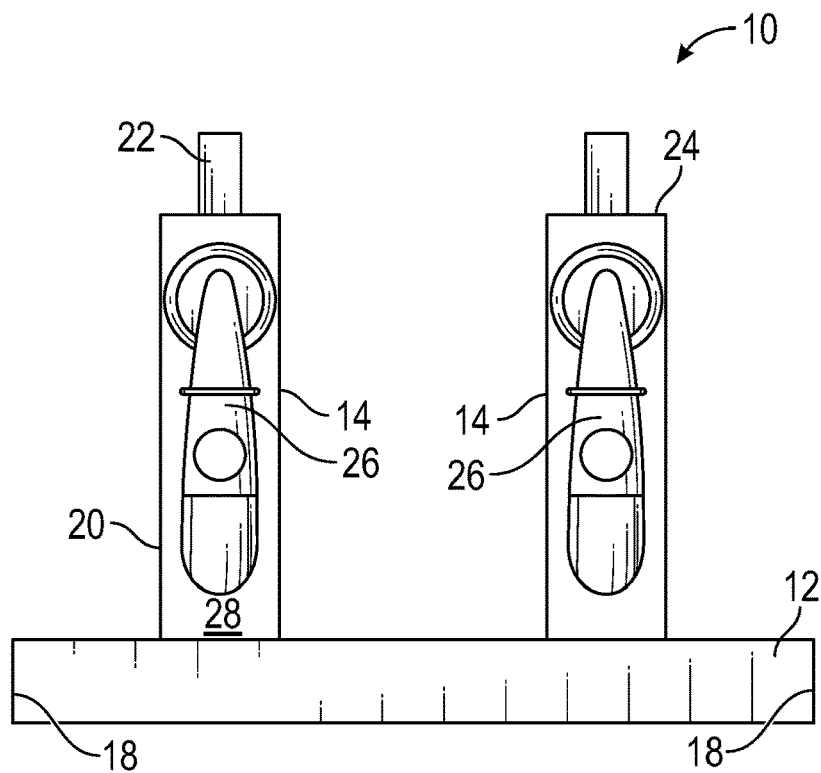
FIG. 1 is a front view of a fishing line braided knotting device according to an embodiment of the disclosure.

With reference now to the drawings, and in particular to FIGS. 1 through 7 thereof, a new knotting device embodying the principles and concepts of an embodiment of the disclosure and generally designated by the reference numeral 10 will be described.

Figure 2:
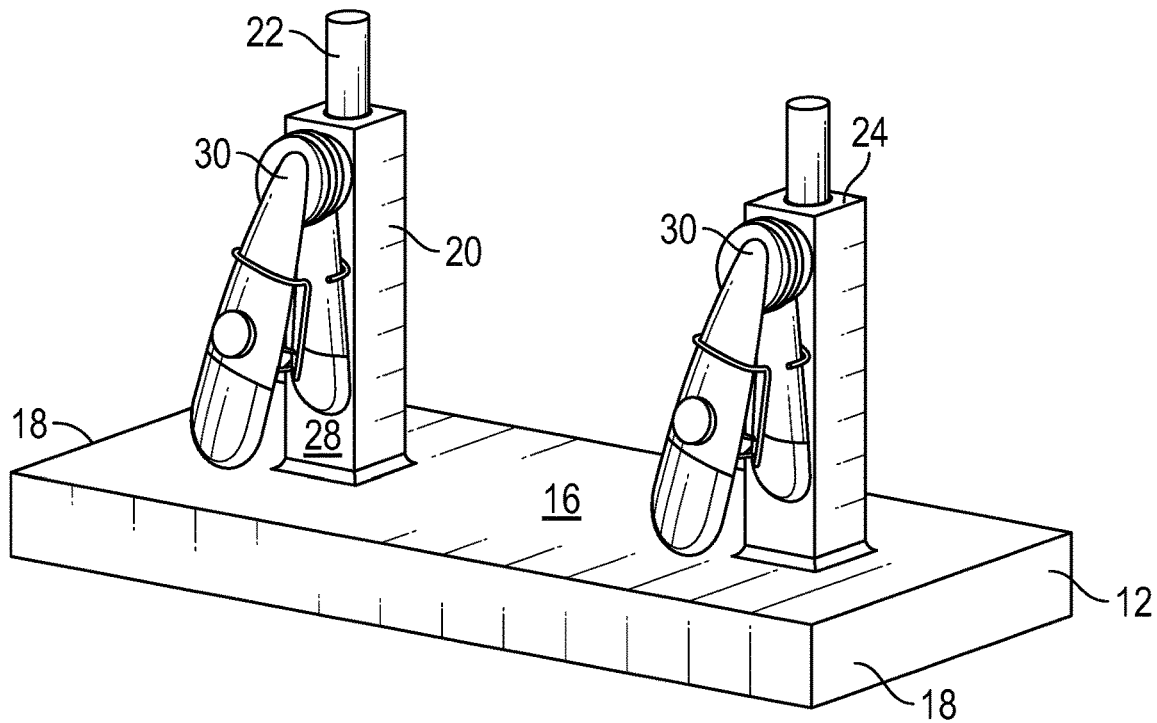
FIG. 2 is an isometric perspective view of an embodiment of the disclosure.
Figure 3:
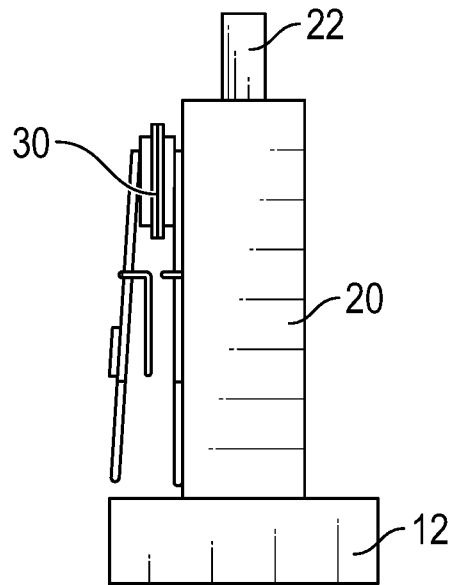
FIG. 3 is a side view of an embodiment of the disclosure.
Figure 4:
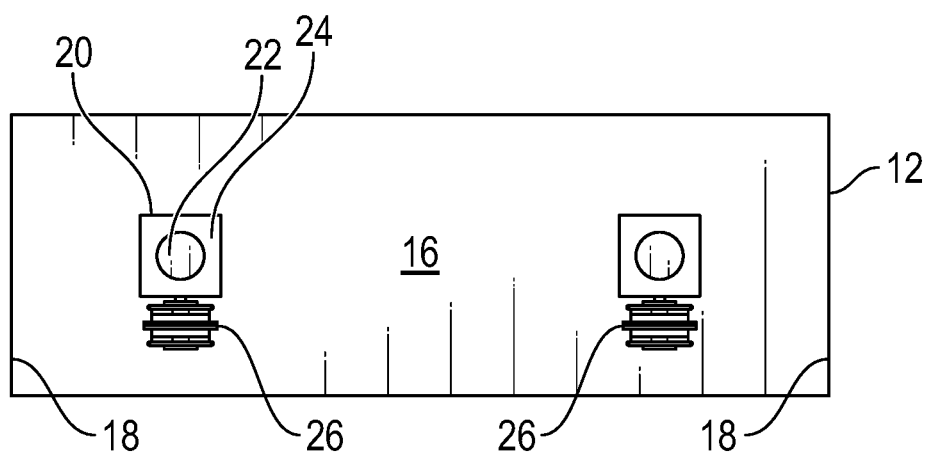
FIG. 4 is a top view of an embodiment of the disclosure.

As best illustrated in FIGS. 1 through 7, the fishing line braided knotting device 10 generally comprises a base 12 to which a pair of posts 14 is attached. As shown in FIG. 4, the base 12 is rectangular, although the present invention also anticipates the base 12 being oval, triangular, and the like. Each post 14 extends substantially perpendicularly from an upper face 16 of the base 12, proximate to a respective opposed end 18 of the base 12. The post 14 comprises a lower portion 20 and an upper portion 22, with the upper portion 22 being circumferentially smaller than the lower portion 20, thereby defining a ridge 24.

As shown in FIG. 2, the lower portion 20 is cuboid and the upper portion 22 is cylindrical. Other shape combinations for the lower portion 20 and upper portion 22 are anticipated by the present invention, such as the lower portion 20 and upper portion 22 both being cylindrical. As will become apparent, the essential feature is that the upper portion 22 is circumferentially smaller than the lower portion 20.

Each fastener 26 of a pair of fasteners 26 is attached to a front face 28 of the lower portion 20 of a respective post 14. The fastener 26 may comprise a spring clamp 30, as shown in FIG. 3, or other fastening means, such as, but not limited to, screw clamps, toggle clamps, and the like.

Figure 5:
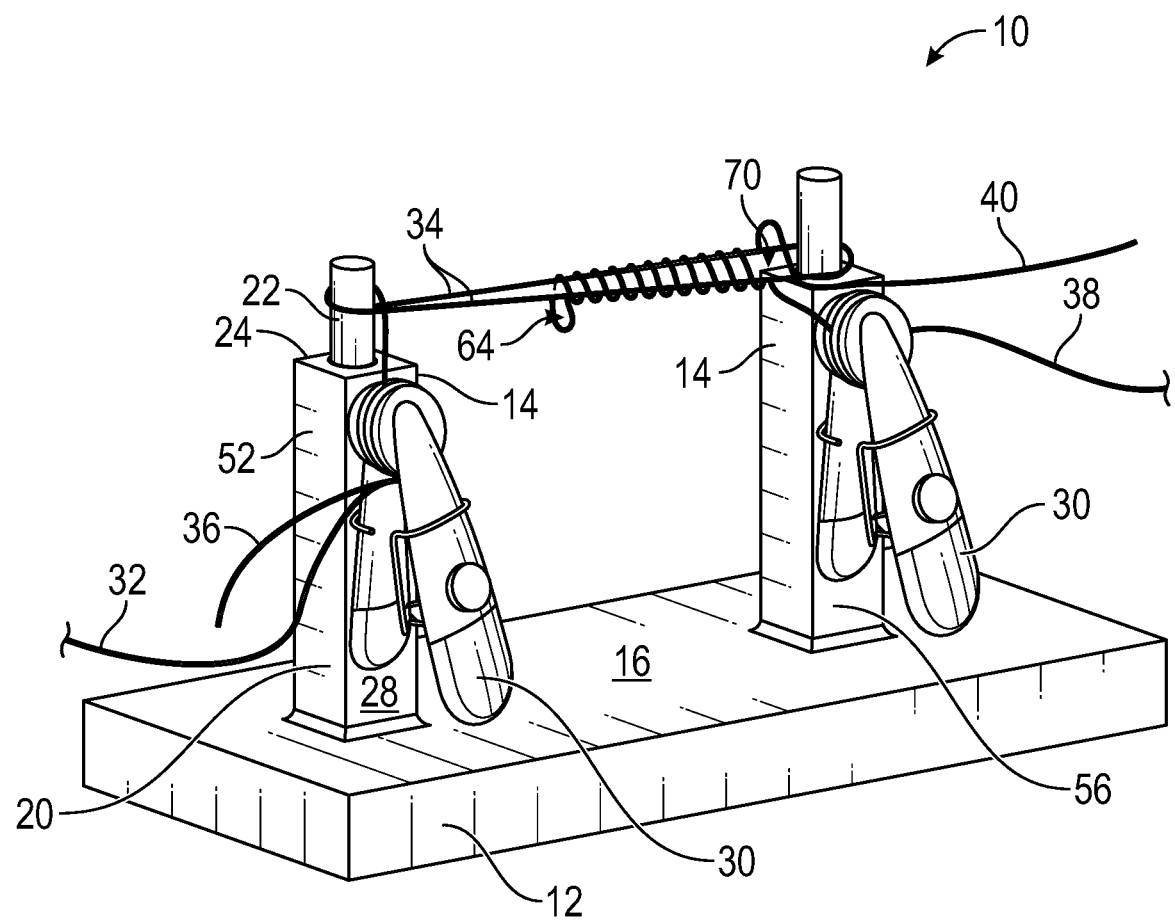
FIG. 5 is an in-use view of an embodiment of the disclosure.
Figure 7:
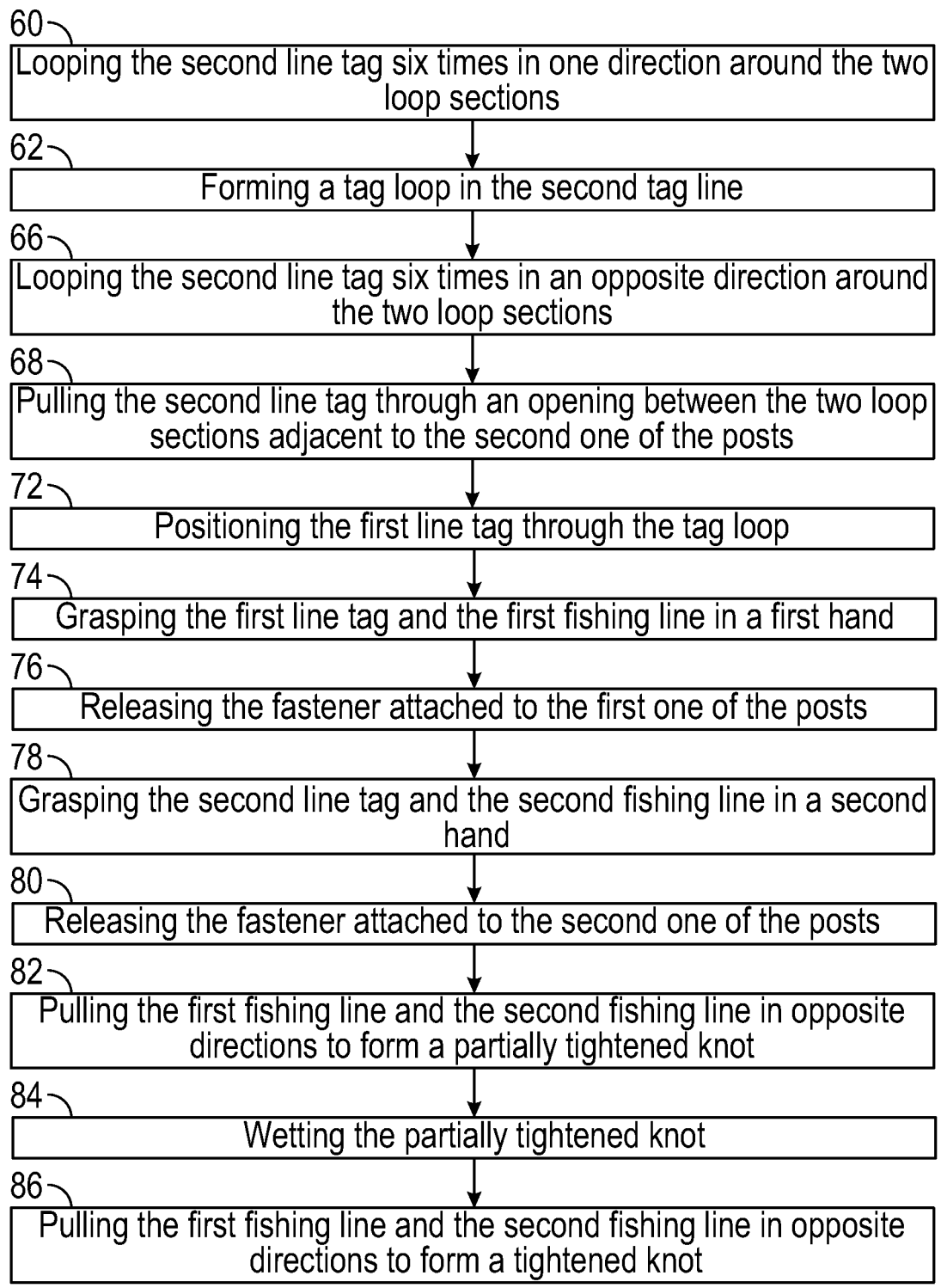
FIG. 7 is a detailed flow diagram for an example knotting step of the method.

The upper portion 22 of the posts 14 are configured to have a first fishing line 32 looped around them so that two loop sections 34 of the first fishing line 32 extend substantially in parallel between the posts 14. As shown in FIG. 5, the two loop sections 34 are positioned atop the ridges 24. One of the fasteners 26 is configured to selectively attach to the first fishing line 32 and a first line tag 36 to removably secure the first fishing line 32 in position around the posts 14. The other of the fasteners 26 is configured to selectively attach to a second fishing line 38 so that a second line tag 40 is available to be selectively positioned around the two loop sections 34 to knot the second fishing line 38 to the first fishing line 32.

While any number of situations may arise requiring a second fishing line 38 to be attached to a first fishing line 32, one example is attachment of a second fishing line 38 (a leader), which is attached to a lure (not shown), to a first fishing line 32 that extends from a reel (not shown). The first fishing line 32 is thicker and is readily visible under water, whereas the second fishing line 38 comprises monofilament or fluorocarbon and is not readily visible. Creating a secure knot between the two is required to attach the lure to the reel in a manner facilitating casting of the lure and optimizing a length of each cast.

Depending on how the second line tag 40 is positioned around the two loop sections 34, a variety of knots can be created, such as, but not limited to, FG knots, Albright knots, and the like. Creating such knots, without use of the fishing line braided knotting device 10, can be difficult as it requires significant dexterity and a requirement to maintain tension on one or both of the first fishing line 32 and the second fishing line 38.

The fishing line braided knotting device 10 enables a method of creating a braided knot for joining two fishing lines 42. The method 42 comprises a first provision step 44 of providing a first fishing line 32 and a second fishing line 38. A second provision step 46 of the method 42 is providing a fishing line braided knotting device 10, as per the specification above.

A first setup step 48 of the method 42 is looping the first fishing line 32 around the upper portions 22 of the posts 14 so that two loop sections 34 of the first fishing line 32 extend substantially in parallel between the posts 14. A second setup step 50 of the method 42 is attaching the first fishing line 32 and a first line tag 36 to a first one 52 of the posts 14 using a respective fastener 26 attached to the first one 52 of the posts 14. A third setup step 54 of the method 42 is attaching the second fishing line 38 to a second one 56 of the posts 14 using a fastener 26 attached to the second one 56 of the posts 14. A knotting step 58 of the method 42 is selectively positioning a second line tag 40 around the two loop sections 34 to knot the second fishing line 38 to the first fishing line 32.

The knotting step 58 of the method 42 can be varied to create a variety of knots. In one example, a first step 60 of the knotting step 58 is looping the second line tag 40 six times in one direction around the two loop sections 34. A second step 62 is forming a tag loop 64 in the second line tag 40. A third step 66 is looping the second line tag 40 six times in an opposite direction around the two loop sections 34. A fourth step 68 is pulling the second line tag 40 through an opening 70 between the two loop sections 34 adjacent to the second one 56 of the posts 14. A fifth step 72 is positioning the first line tag 36 through the tag loop 64.

A sixth step 74 is grasping the first line tag 36 and the first fishing line 32 in a first hand. A seventh step 76 is releasing the fastener 26 attached to the first one 52 of the posts 14. An eight step 78 is grasping the second line tag 40 and the second fishing line 38 in a second hand. A ninth step 80 is releasing the fastener 26 attached to the second one of the posts 14. A tenth step 82 is pulling the first fishing line 32 and the second fishing line 38 in opposite directions to form a partially tightened knot. An eleventh step 84 is wetting the partially tightened knot. A twelfth step 86 is pulling the first fishing line 32 and the second fishing line 38 in opposite directions to form a tightened knot.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A method of creating a braided knot for joining two fishing lines comprising the steps of:
    providing a first fishing line and a second fishing line;
    providing a fishing line braided knotting device comprising:
        a base,
        a pair of posts, each post being attached to and extending substantially perpendicularly from an upper face of the base proximate to a respective opposed end of the base, the post comprising:
            a lower portion, and
            an upper portion, the upper portion being circumferentially smaller than the lower portion defining a ridge, and
        a pair of fasteners, each fastener being attached to a front face of the lower portion of a respective post;
    looping the first fishing line around the upper portions of the posts, such that two loop sections of the first fishing line extend substantially in parallel between the posts;
    attaching the first fishing line and a first line tag to a first one of the posts using a fastener attached to the first one of the posts;

attaching the second fishing line to a second one of the posts using a fastener attached to the second one of the posts;
selectively positioning a second line tag around the two loop sections to knot the second fishing line to the first fishing line; and
wherein the step of selectively positioning a second line tag around the two loop sections comprises:
  looping the second line tag six times in one direction around the two loop sections;
  forming a tag loop in the second tag line;
  looping the second line tag six times in an opposite direction around the two loop sections;
  pulling the second line tag through an opening between the two loop sections adjacent to the second one of the posts;
  positioning the first line tag through the tag loop;
  grasping the first line tag and the first fishing line in a first hand;
  releasing the fastener attached to the first one of the posts;
  grasping the second line tag and the second fishing line in a second hand;
  releasing the fastener attached to the second one of the posts;
  pulling the first fishing line and the second fishing line in opposite directions to form a partially tightened knot;
  wetting the partially tightened knot; and
  pulling the first fishing line and the second fishing line in opposite directions to form a tightened knot.

* * * * *